US008596730B2

(12) United States Patent
Chen et al.

(10) Patent No.: US 8,596,730 B2
(45) Date of Patent: Dec. 3, 2013

(54) COMPUTER ENCLOSURE WITH SECURING MEMBER

(75) Inventors: Yun-Lung Chen, New Taipei (TW); Liang-Chin Wang, New Taipei (TW); Jian Hu, Wuhan (CN); Yu-Ming Xiao, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 102 days.

(21) Appl. No.: 13/304,348

(22) Filed: Nov. 24, 2011

(65) Prior Publication Data
US 2012/0274191 A1 Nov. 1, 2012

(30) Foreign Application Priority Data
Apr. 26, 2011 (CN) .......................... 2011 1 0105298

(51) Int. Cl.
*A47B 81/00* (2006.01)
(52) U.S. Cl.
USPC ....................................................... 312/223.2
(58) Field of Classification Search
USPC ................. 312/223.2; 361/679.58, 679.6
See application file for complete search history.

(56) References Cited

U.S. PATENT DOCUMENTS

| 5,257,163 | A * | 10/1993 | Buist et al. ............... 361/679.32 |
| 6,157,534 | A * | 12/2000 | Gallagher et al. ............ 361/724 |
| 6,279,754 | B1 * | 8/2001 | Hoss et al. ........................ 211/26 |
| 6,618,255 | B2 * | 9/2003 | Fairchild ........................ 361/726 |
| 7,259,959 | B2 * | 8/2007 | Tu et al. .................... 361/679.33 |
| 7,417,855 | B2 * | 8/2008 | Carnevali ................ 361/679.41 |
| 7,511,230 | B2 * | 3/2009 | Cochrane ...................... 174/382 |
| 8,027,159 | B2 * | 9/2011 | Yu et al. ................... 361/679.58 |
| 8,039,763 | B1 * | 10/2011 | Cochrane ...................... 174/377 |
| 8,081,452 | B2 * | 12/2011 | Zhang ........................ 361/679.58 |
| 2006/0061949 | A1 * | 3/2006 | Chen et al. ..................... 361/683 |
| 2008/0174949 | A1 * | 7/2008 | Lai et al. ........................ 361/685 |
| 2011/0266933 | A1 * | 11/2011 | Hanna ........................ 312/223.2 |

* cited by examiner

*Primary Examiner* — Hanh V Tran
(74) *Attorney, Agent, or Firm* — Altis & Wispro Law Group, Inc.

(57) ABSTRACT

A computer enclosure comprises a chassis with a first securing hole; a cover plate detachably attached to the chassis, a second securing hole defined in the cover plate and aligned with the first securing hole; and a securing member comprising a fastener and a coil spring; the fastener comprises a head, and a shaft extending from the head; the coil spring is attached to the shaft and between the head and the cover plate; and the shaft extends into the second securing hole, wherein the fastener is movable between released and locked positions; in the released position, the shaft is disengaged from the first securing hole, the coil spring is not compressed, and the cover plate is detachable from the chassis; in a locked position, the shaft is engaged into the first securing hole, the coil spring is compressed, and the cover plate is secured to the chassis.

18 Claims, 5 Drawing Sheets

COMPUTER ENCLOSURE WITH SECURING MEMBER

BACKGROUND

1. Technical Field

The present disclosure relates to a computer enclosure with a securing member for securing a cover plate of the computer enclosure.

2. Description of Related Art

A typical computer enclosure includes a chassis, and a cover plate pivotably attached to the chassis. The chassis includes a base plate, a first pair of side plates extending from a first pair of opposite edges of the base plate, and a second pair of side plates extending from a second pair of opposite edges of the base plate. The chassis defines an opening surrounded by the first pair of side plates and the second pair of side plates. The cover plate is secured to the chassis by screws to cover the opening, which may be inconvenient for a user to remove the cover plate.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
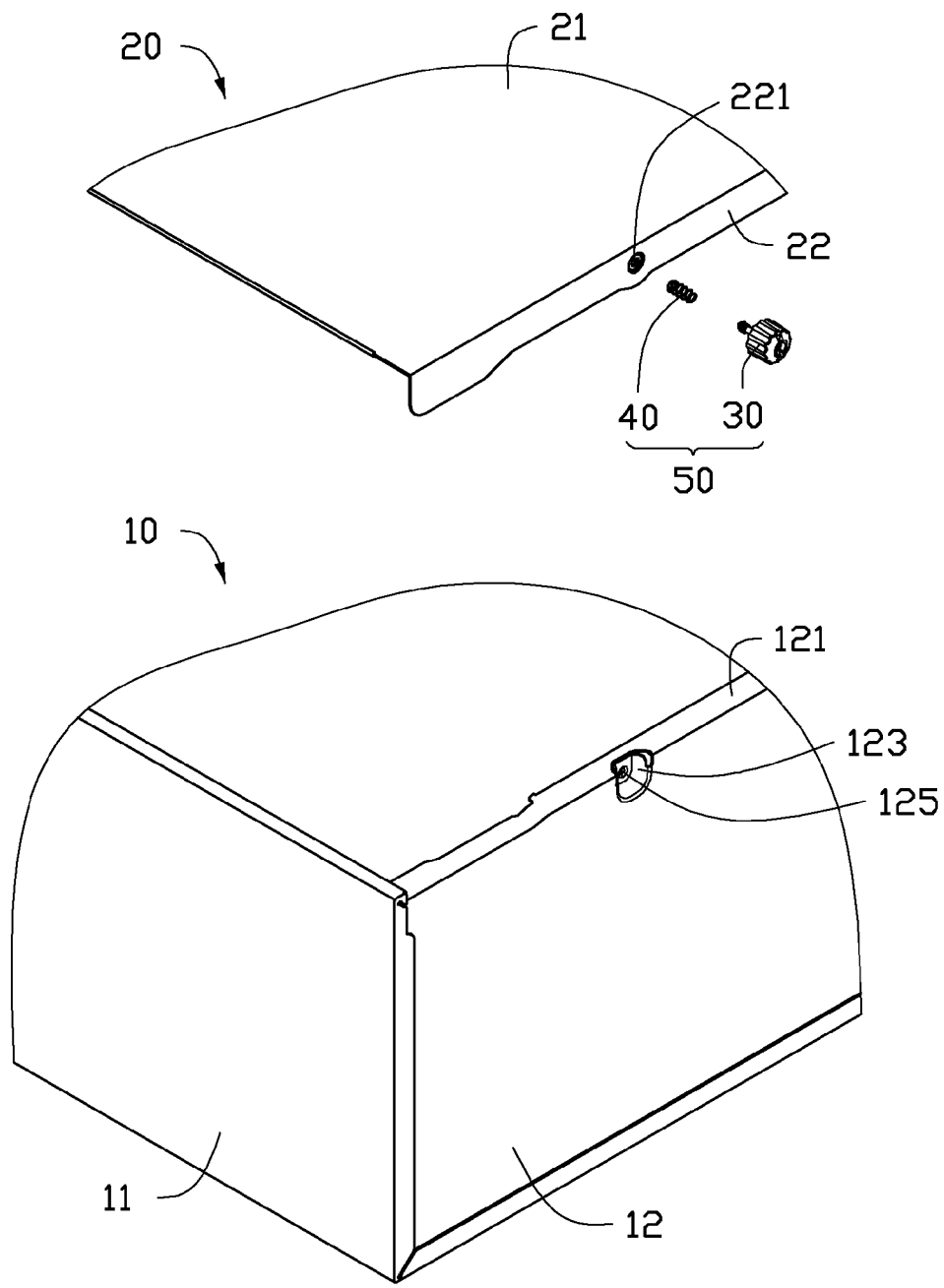
FIG. 1 is an exploded, isometric view of an embodiment of a computer enclosure with a securing member.

Referring to FIG. 1, an embodiment of a computer enclosure comprises a chassis 10, a cover plate 20, and a securing member 50. The securing member 50 comprises a fastener 30 and a coil spring 40. The chassis 10 comprises a first side plate 11, and a second side plate 12 perpendicularly connected to the first side plate 11. A top flange 121 substantially perpendicularly extends from a top edge of the second side plate 12. The second side plate 12 comprises a concave portion 123 in a proximity to the top flange 121. A first securing hole 125 is defined in the concave portion 123 corresponding to the fastener 30. The cover plate 20 comprises a main plate 21 and, a side flange 22 substantially perpendicularly extending from an edge of the main plate 21. A second securing hole 221 is defined in the side flange 22 corresponding to the fastener 30.

Figure 2:
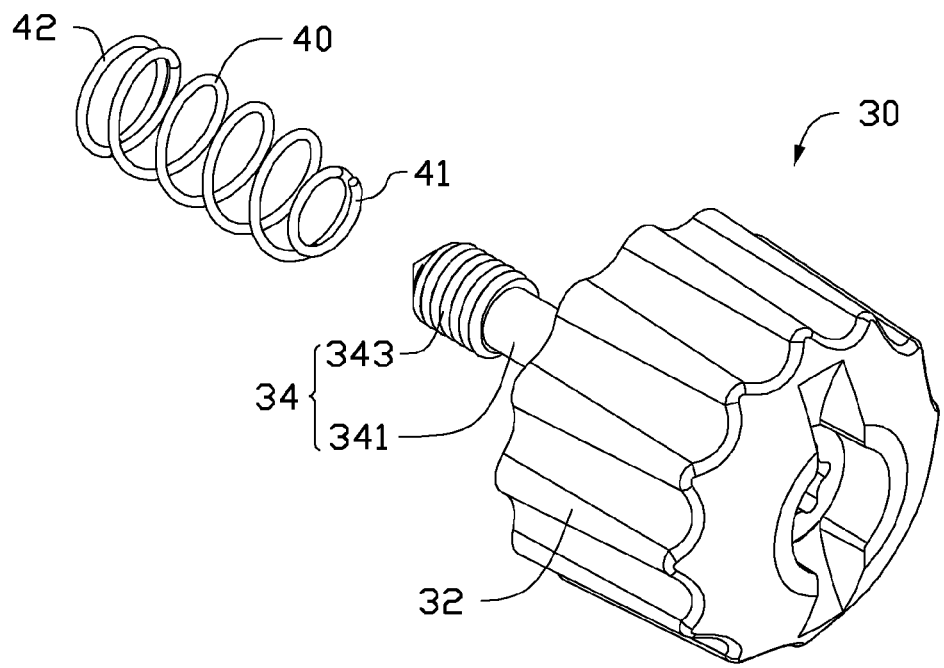
FIG. 2 is an isometric view of the securing member of FIG. 1.
Figure 3:
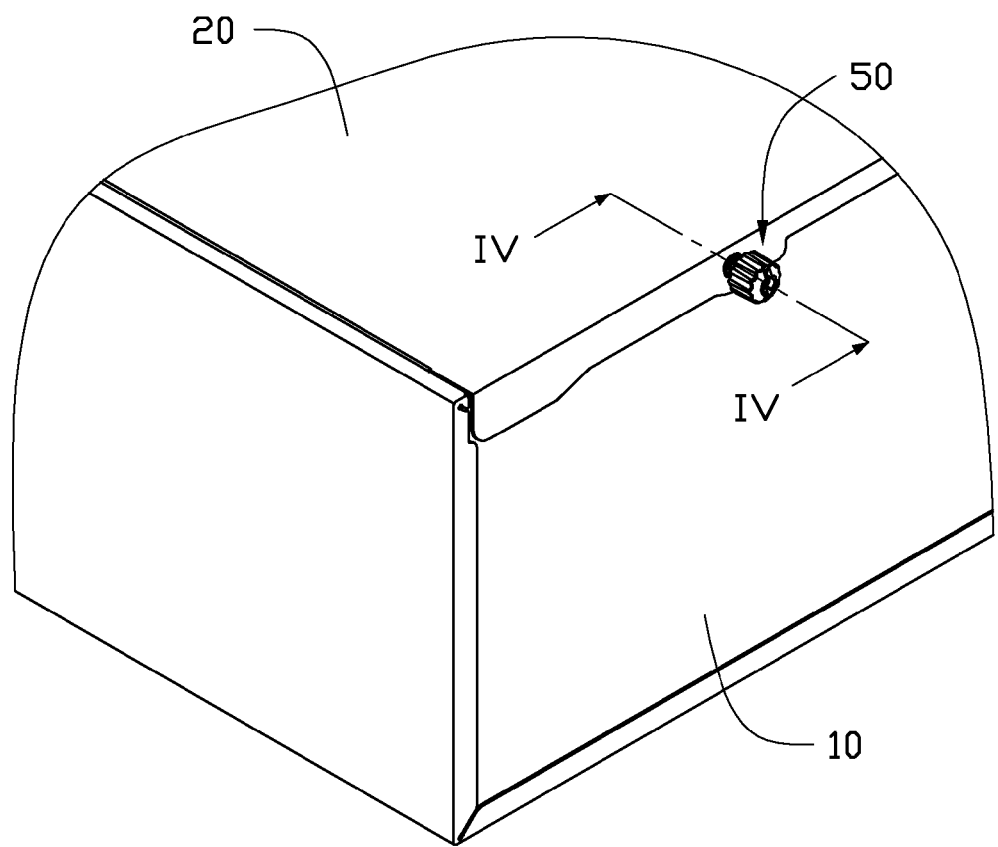
FIG. 3 is an assembled view of the computer enclosure of FIG. 1.

Referring to FIG. 2, the fastener 30 comprises a head 32, and a shaft 34 extending from an inner central portion of the head 32 along an axial direction of the fastener 30. The shaft 34 comprises a cylindrical main portion 341 and a threaded end 343. The cylindrical main portion 341 is connected between the head 32 and the threaded end 343. A diameter of the threaded end 343 is greater than that of the cylindrical main body 341, but less than that of the head 32. The diameter of the threaded end 343 is substantially equal to a diameter of the first securing hole 125, or a diameter of the second securing hole 221. The coil spring 40 comprises a first coil end 41 and a second coil end 42. A diameter of the first coil end 41 is less than a diameter of the second coil end 42. The diameter of the first coil end 41 is substantially equal to a diameter of the cylindrical main body 341. The diameter of the second coil end 42 is greater than that of the threaded end 343. In one embodiment, the coil spring 40 comprises a central portion connected between the first coil end 41 and the second coil end 42. The central portion of the coil spring 40 has a same diameter as the diameter of the second coil end 42.

Referring to FIGS. 1 to 5, in assembly, the threaded end 343 expands the first coil end 41 to extend into the coil spring 40. The first coil end 41 returns to its original shape after moving from the threaded end 343 to the cylindrical main body 341. The first coil end 41 abuts the head 32 and secures to the cylindrical main body 341 by a static frictional force. The cover plate 20 is placed on the first side plate 11 and the second side plate 12. The main plate 21 is substantially perpendicular to the first side plate 11 and the second side plate 12, and the main plate 21 abuts the top flange 121. The side flange 22 abuts the second side plate 12. The second securing hole 221 is aligned with the first securing hole 125. The second end 42 of the coil spring 40 is near the second securing hole 221 and abuts the side flange 22. The head 32 of the fastener 30 is pressed and moves towards the second securing hole 221. In one embodiment, each of the first securing hole 125 and the second securing hole 221 is a threaded hole engageable with the threaded end 343 of the fastener 30. The threaded end 343 is screwed into and extends through the second securing hole 221. The cylindrical main body 341 is engaged in the second securing hole 221.

Figure 4:
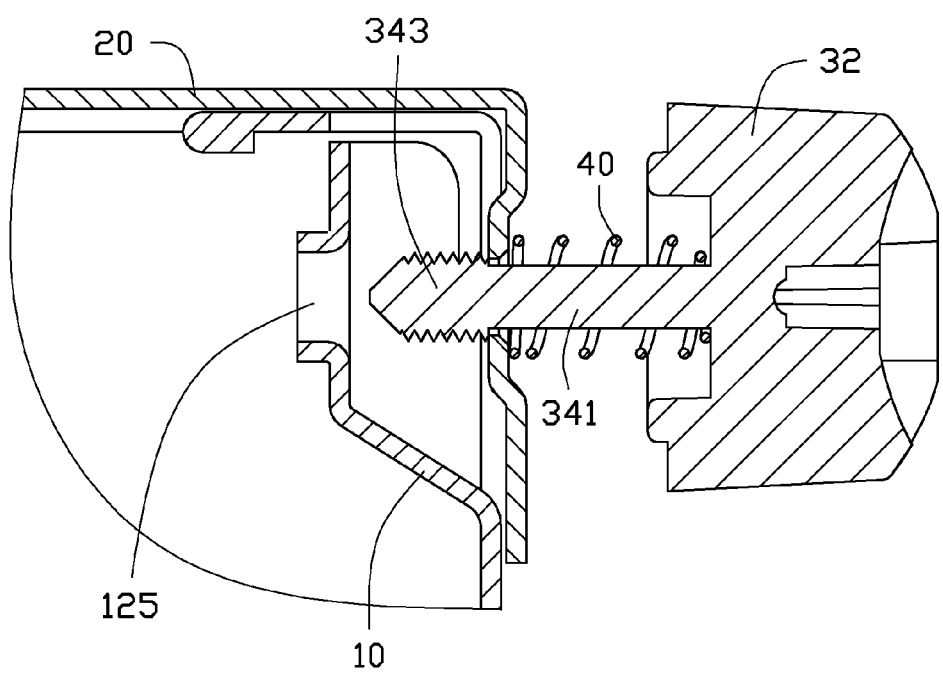
FIG. 4 is a cross-sectional view of the computer enclosure of FIG. 3 along the line IV-IV, showing the securing member in an unlocked position.

When the fastener 30 is in a released position as shown in FIG. 4, the threaded end 343 is spaced from the first securing hole 125. The coil spring 40 is in an original position and has the same length as the shaft 34. The cover plate 20 is in an unlocked position and is removable from the chassis 10.

Figure 5:
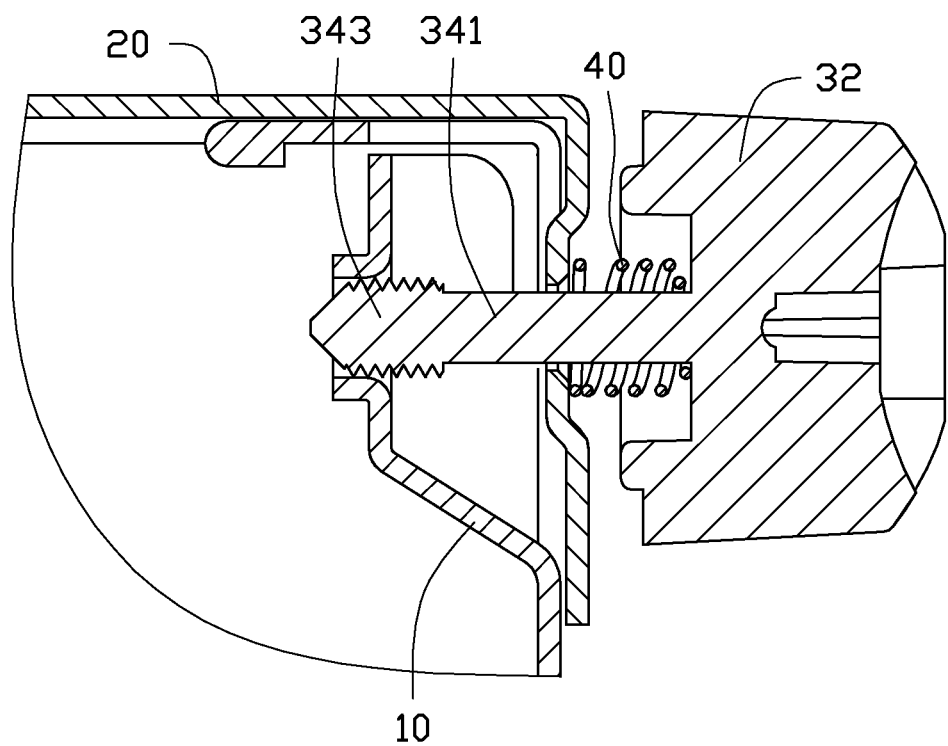
FIG. 5 is similar to FIG. 4, but shows the securing member in a locked position.

To lock the cover plate 20 as shown in FIG. 5, the head 32 is pressed and moves towards the first securing hole 125. The coil spring 40 is compressed, and then the threaded end 343 is screwed into the first securing hole 125. Then the fastener 30 is in a locked position wherein the cover plate 20 is secured to the chassis 10.

To unlock the cover plate 20, the threaded end 343 is unscrewed from the first securing hole 125. The coil spring 40 urges the fastener 30 to move to the released position and resumes the original position. Then the cover plate 20 is in the unlocked state and may be removed from the chassis 10.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure comprising:
a chassis with a first securing hole; the chassis comprising a side plate, a top flange extending from the side plate, and a depressed portion defined in the side plate and the top flange; the depressed portion is depressed towards an inner side of the chassis; and the first securing hole is defined in the depressed portion;
a cover plate detachably attached to the chassis, a second securing hole defined in the cover plate and aligned with the first securing hole; and
a securing member comprising a fastener and a coil spring; wherein the fastener comprises a head, and a shaft extending from the head; the coil spring is attached to the shaft and located between the head of the fastener and the cover plate; and the shaft extends into the second securing hole;
wherein the fastener is movable between a released position and a locked position; in the released position, the shaft is disengaged from the first securing hole, the coil spring is not compressed, and the cover plate is detachable from the chassis; in a locked position, the shaft is engaged into the first securing hole, the coil spring is compressed, and the cover plate is secured to the chassis; and the depressed portion provides a space to allow movement of the shaft.

2. The computer enclosure of claim 1, wherein the shaft comprises a threaded portion located at a distal end of the shaft, and a cylindrical main body connected between the head and the threaded portion of the fastener, and a depth of the depressed portion is greater than a length of the threaded portion.

3. The computer enclosure of claim 2, wherein the coil spring comprises a first coil end secured to the cylindrical main body and abutting the head of the fastener, and the coil spring further comprises a second coil end, and a diameter of the first coil end is less than a diameter of the second coil end.

4. The computer enclosure of claim 3, wherein the coil spring further comprises a central portion connected between the first coil end and the second coil end, the central portion has a diameter same as the diameter of the second coil end.

5. The computer enclosure of claim 3, wherein a diameter of the threaded portion is greater than a diameter of the cylindrical main body, the diameter of the threaded portion is less than a diameter of the head of the fastener.

6. The computer enclosure of claim 5, wherein the diameter of the first coil end is substantially equal to the diameter of the cylindrical main body, and the diameter of the second coil end is greater than the diameter of the threaded portion of the fastener.

7. The computer enclosure of claim 2, when the coil spring is not compressed, the coil spring has a first length substantially equal to a length of the cylindrical main body of the fastener; and when the coil spring is compressed, the coil spring has a second length less than the length of the cylindrical main body of the fastener.

8. The computer enclosure of claim 2, wherein each of the first securing hole and the second securing hole is a threaded hole engagable with the threaded rtion of the fastener.

9. The computer enclosure of claim 1, wherein the cover plate comprises a main plate, and a side flange extending from the main plate, and abutting the side plate; the main plate is substantially perpendicular to the side plate and abuts the top flange of the side plate; and the second securing hole is defined in the side flange.

10. The computer enclosure of claim 1, wherein the head has a serrated, wavy shape for facilitating operating the fastener.

11. A computer enclosure comprising:
a chassis with a first securing hole, the chassis comprising a side plate, a top flange extending from the side plate, and a depressed portion defined in the side plate and the top flange; the depressed portion is depressed towards an inner side of the chassis, and the first securing hole is defined in the depressed portion;
a cover plate with a second securing hole aligned with the first securing hole; and
a securing member, wherein the securing member is engaged with the second securing hole, movable between a released position and a locked position; in the released position, the securing member is disengaged from the first securing hole; and in the locked position, the securing member is engaged with the first securing hole, and
wherein the securing member comprises a fastener and a coil spring; the fastener comprises a head, and a shaft engagable with the first securing hole and the second securing hole; the coil spring is attached to the shaft, and located between the head of the fastener and the cover plate; the coil spring is adapted to urge the securing member moving from the locked position to the released position; and the depressed portion provides a space to allow movement of the fastener.

12. The computer enclosure of claim 11, wherein the shaft comprises a threaded end and a cylindrical main body connected between the head and the threaded end of the fastener, and the coil spring comprises a first coil end secured to the cylindrical main body and abutting the head of the fastener.

13. The computer enclosure of claim 12, wherein the coil spring further comprises a second coil end, and a diameter of the first coil end is less than a diameter of the second coil end.

14. The computer enclosure of claim 13, wherein the coil spring further comprises a central portion connected between the first coil end and the second coil end, the central portion has a diameter same as the diameter of the second coil end.

15. The computer enclosure of claim 13, wherein a diameter of the threaded end is greater than a diameter of the cylindrical main body, the diameter of the threaded end is less than a diameter of the head of the fastener.

16. The computer enclosure of claim 15, wherein the diameter of the first coil end is substantially equal to the diameter of the cylindrical main body, and the diameter of the second coil end is greater than the diameter of the threaded end of the fastener.

17. The computer enclosure of claim 12, when the coil spring is not compresses, the coil spring has a first length substantially equal to a length of the cylindrical main body of the fastener; and when the coil spring is compressed, the coil spring has a second length less than the length of the cylindrical main body of the fastener.

18. The computer enclosure of claim 11, wherein the cover plate comprises a main plate, and a side flange extending from the main plate, and abutting the side plate; the main plate is substantially perpendicular to the side plate and abuts the top flange of the side plate; and the second securing hole is defined in the side flange.

* * * * *